(12) United States Patent
Cron et al.

(10) Patent No.: US 9,254,716 B2
(45) Date of Patent: Feb. 9, 2016

(54) SPOKE EDGE GEOMETRY FOR A NON-PNEUMATIC TIRE

(75) Inventors: Steven M. Cron, Greenville, SC (US); Michael Edward Dotson, Greenville, SC (US); Kevin C. Miles, Clemson, SC (US); Timothy Brett Rhyne, Greenville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 212 days.

(21) Appl. No.: 13/819,972

(22) PCT Filed: Aug. 16, 2011

(86) PCT No.: PCT/US2011/047864
§ 371 (c)(1),
(2), (4) Date: Feb. 28, 2013

(87) PCT Pub. No.: WO2012/030519
PCT Pub. Date: Mar. 8, 2012

(65) Prior Publication Data
US 2013/0240097 A1    Sep. 19, 2013

Related U.S. Application Data

(60) Provisional application No. 61/379,351, filed on Jan. 9, 2010.

(51) Int. Cl.
B60C 7/14        (2006.01)
B29D 30/02       (2006.01)
B60B 9/26        (2006.01)
B60C 7/22        (2006.01)

(52) U.S. Cl.
CPC . B60C 7/14 (2013.01); B29D 30/02 (2013.01); B60B 9/26 (2013.01); B60C 7/22 (2013.01); B60C 2007/107 (2013.04); B60C 2007/146 (2013.04)

(58) Field of Classification Search
CPC ............... B60C 7/10; B60C 2007/107; B60C 2007/146; B60C 7/14; B60B 9/26; B29D 30/02
USPC ............... 152/1, 5, 7, 11, 12, 69, 75, 76, 246, 152/270, 323, 324, 326
See application file for complete search history.

(56) References Cited

U.S. PATENT DOCUMENTS

| | | | |
|---|---|---|---|
| 2,713,513 A | 7/1955 | Lyon | |
| 4,235,410 A | 11/1980 | Nelson | |
| 4,387,070 A | 6/1983 | Cunard | |
| 4,530,484 A | 7/1985 | Baba | |
| 5,223,599 A * | 6/1993 | Gajewski | 528/59 |
| 6,086,161 A | 7/2000 | Luttgeharm | |
| 7,201,194 B2 * | 4/2007 | Rhyne et al. | 152/5 |

OTHER PUBLICATIONS

International Search Report with Written Opinion; dated Mar. 20, 2012.

* cited by examiner

Primary Examiner — Kip T Kotter
(74) Attorney, Agent, or Firm — John Steckler Schwab

(57) ABSTRACT

An improved spoke edge geometry for a non-pneumatic or hybrid tire. The spoke edge geometry possesses a reduced cross-section that reduces the bending stresses locally and allows a unique mold construction that changes the placement and orientation of potential flash.

17 Claims, 5 Drawing Sheets

SPOKE EDGE GEOMETRY FOR A NON-PNEUMATIC TIRE

PRIORITY CLAIM

This application claims the benefit of previously filed U.S. Provisional Patent Application entitled "Spoke Edge Geometry for a Non-Pneumatic Tire", assigned U.S. Ser. No. 61/379,351, filed Sep. 1, 2010, and which is incorporated herein by reference in its entirety for all purposes.

BACKGROUND OF THE INVENTION

1. Field of the Invention

The present invention provides improved spoke edge geometry for a non-pneumatic or hybrid tire that is less prone to fatigue when used. The present invention also provides a way to manufacture such geometry in a mold. In particular, the spoke edge geometry is provided with a reduced crass-section that reduces the bending stresses locally and allows a unique mold construction that changes the placement and orientation of potential flash and reduces other potential molding flaws when a liquid such as polyurethane is introduced into the cavity of the mold to form a spoke. This change results in a reduction in the possibility of a stress riser being found near the edge of the spoke, enhancing the durability of the tire.

2. Description of the Related Art

Non-pneumatic or structurally supported tires have been disclosed in the art. For example, U.S. Pat. No. 7,201,194, commonly owned by the applicant of the present invention, relates to a structurally supported resilient tire that supports a load without internal air pressure. The content of this patent is hereby incorporated by reference in its entirety. In an exemplary embodiment, this non-pneumatic tire includes an outer annular shear band and a plurality of web spokes that extend transversely across and radially inward from the annular band and are anchored in a wheel or hub. In certain exemplary embodiments, the annular shear band may further comprise a shear layer, at least a first membrane adhered to the radially inward extent of the shear layer and at least a second membrane adhered to the radially outward extent of the shear layer. In addition to the ability to operate without a required inflation pressure, the invention of U.S. Pat. No. 7,201,194 also provides advantages that include a more uniform ground contact pressure throughout the length of the contact area. Hence, this tire mimics the performance of a pneumatic tire.

FIG. 1 shows such a tire defining radial R and axial A directions. For reference, all the reference numerals in the 100's used herein refer to a previous tire, spoke and mold design while all reference numerals in the 200's used herein refer to a new and improved tire, spoke and mold design according to an embodiment of the present invention. The tire 100, 200 comprises a tread 102, 202 that is attached to the outward extent 104, 204 of the spokes 106, 206, which in turn, are connected to a hub or wheel 108, 208 at their inward extent 110, 210 by means known in the art. For the version of the tire 100, 200 shown, the spokes 106, 206 are formed by pouring a polyurethane liquid into a rotational mold where the liquid is then cured or hardened. It can also be seen that the spokes 108, 206 are grouped in pairs and that the individual spokes 106', 106", 206', 206" within each pair are consistently spaced from each other and that each pair is spaced consistently from the adjacent pair around the circumference of the tire. The spacing within each pair and the spacing between each adjacent pair do not need to be the same.

As described by the Abstract and col. 2, lines 28-41 of the '194 patent, the spokes 106, 206 support the tire 100, 200 in tension near the top of the tire 100, 200 and not in compression at the bottom of the tire 100. Instead, the spokes 106, 206 at the bottom of the tire near the contact patch, which is where the tread 102, 202 of the tire contacts the road, compress or buckle easily. This helps the tire to simulate the pneumatic support function of a pneumatic tire. As can be imagined, these spokes 106, 206 undergo a great deal of cyclic stress from tension to compression especially as the tire 100, 200 rotates at high speeds. This creates a risk of fatigue failure for the spokes. Consequently, the endurance of the spokes 106, 206 and the operability of the tire 100, 200 depend significantly on the accuracy of the geometry with which the spokes 106, 206 are made and the lack of any stress risers caused by manufacturing flaws.

Looking now at FIGS. 2A, 2B and 2C, front, side and sectional views respectively of a previous spoke design that was susceptible to molding flaws are shown. For the sake of clarity, the tread has been omitted. Focusing on FIG. 2C, the cross-sectional shape of spokes 106', 106" can be seen. The thickness of the spoke, $T_{106}$, which is relatively consistent at 4 mm, and the edges 112', 112" of the spokes 106', 106" where flash 114 frequently occurs during the molding process are illustrated. The flash 114 is located near the edges 112', 112" of the spokes 106', 106" where radii 116 have been added to aid in stress reduction as the spokes 106', 106" cycle between tension and compression as the tire 100 rotates on a road surface under a vertical load. The reason why this flash occurs and why it is located as illustrated will be discussed more fully later. Since the cross section of the spokes 106', 106" is fairly straight and constant, the neutral axis or plane 118 about which each spoke 106', 106" flexes is essentially on the mid-plane of the spoke 106', 106" and the bending moment from a straight exterior surface 120 of the spoke 106', 106" to the neutral plane 118 remains fairly constant all the way to either edge of the spoke 106', 106".

In addition to the flash 114, the manner in which the mold that formed this geometry was built creates the possibility of mold mismatch from one side of the mold to the other which means that in addition to or sometimes instead of the presence of flash 114, the filleted edges 116 of the spokes 106 do not line up exactly with a straight exterior surface 120 of the spoke 106, creating a small ledge or corner near the edge of the spoke 106. This too can be undesirable for reasons that will be discussed below. A more complete explanation for this molding flaw will be discussed later.

Testing of this spoke design has revealed that any of these locations of flash 114 or mold mismatch create a stress riser as the spoke 106 cycles between tension and compression as the tire 100 rolls on a road surface. These manufacturing flaws then lead to crack initiation and propagation that can cause the spoke 106 to fail, undesirably impairing the operability of the tire 100. The location of these flaws is less than optimal because they are found near the edge 112 of the spokes 106 where they bend, creating high strains and stresses which cause cracks to initiate. Also, the orientation of the flash 114 is less than optimal since it is perpendicular or oblique to the neutral bending plane 118 of the spoke 106, which means that the flaw it creates is aligned with the direction in which the flash has a natural tendency to propagate cracks as the longest dimension of flash is the one that is bent, creating the highest moment and largest stress concentration in the flash. Put into other words, the flash is oriented in its most rigid configuration relative to the bending of the spokes making it more susceptible to cracking and this adds to the susceptibility of the spoke to fail 106.

Turning to FIG. 3, a general representation of how the mold 122 that made the previous spoke configuration was constructed is depicted. A first set of cores 124 that extend from a first mold half 126 and that Interarticulate with a second set of cores 128 that extend from a second mold half 130 form the majority of the surface area of the cavities 132, which are the negative image of the spokes that are formed. Each core has a 0.25° of draft on a side and this in conjunction with the interarticulation of the cores 124, 128 allows the spokes to maintain a constant thickness which helps maintain the strength of the spokes. It should be noted that these cores 124, 128 are actually arranged in a circular array in the mold 122 and that this figure shows their cross-sections projected onto a flat plane for ease of illustration. Also, common mold features such as venting for helping proper mold fill by allowing the escape of trapped gas and alignment features such as taper pins for facilitating mold alignment for the cores 124, 128 and mold halves 126, 130 have been omitted for the sake of clarity. Also, the cores are shown to be solid extensions of the mold halves 126, 130 but in actuality these are often separate inserts that are retained within the mold halves 126, 130 and that can be easily replaced should a core 124, 128 be damaged.

Looking more closely at the ends 133 of the cavities 132 that form the fillets found on the spokes, it can be seen that they are found adjacent to flat shut off surfaces 134 where the core 124, 128 extending from one mold half 126, 130 contacts or nearly contacts the other mold half 126, 130. As a result of this mold configuration, it is possible for a liquid such as polyurethane to seep into this space if a large enough gap is created due to machining tolerances, core deflection due to mold processing conditions, etc. This creates the undesired flash that has been previously described near the edges of the spokes. Also, since the parting line is perpendicular to the direction of the extension of the cores 124, 128, the flash will be nearly orthogonal to the bending plane of the spokes, which is undesirable as explained above.

Looking now at FIG. 3A, which is an enlarged view of the radiused end portion 133 of the cavities 132, an example of mold mismatch is given. As shown, the core 128 extends undesirably into the cavity 132, creating a ledge or corner 138 that forms the complimentary shaped ledge or corner geometry in the spoke. In this case, either the location of the radiused end 133 is in the improper place due to manufacturing errors and/or tolerance stack ups, and/or the core is deflected, improperly manufactured, etc. so that the straight surface 138 of the core 128 is not tangent to the radiused end 133 of the cavity 132 but is shifted downward relative to the radiused end 133 of the cavity 132 as seen in FIG. 3A. Sometimes, this geometry is reversed and the core 128 is shifted upward relative to the radiused end 133 of the cavity 132 as seen in FIG. 3A. In either case, the ledge 138 that mold mismatch creates may also create a stress riser that is undesirably positioned and oriented since it is located on an outside surface near the edge of the spokes and is perpendicular to the natural bending plane of the spoke. So this too can initiate cracks that could cause the spoke to fail. Mold mismatch may occur in any, all or none of the cavities of the previous mold construction depending on a host of variables such as core deflection due to mold processing conditions, improper machining, and tolerance stack ups, etc.

Accordingly, there is a need for an improved spoke edge design and mold for creating this geometry that limits the creation and changes the orientation of molding flaws such as flash and mold mismatch near the edge of the spokes. Also, revised spoke edge geometry for reducing the strains and stresses found in this area would be helpful.

SUMMARY OF THE INVENTION

A tire according to an aspect of the present invention comprises a tread and a spoke having main body geometry and free edge geometry found at an axial extremity of the spoke that has a reduced cross-sectional area as compared to the main body geometry.

Sometimes, the thickness of the main body geometry is approximately 4 mm but may be altered to suit a particular application.

The spoke edge geometry may also include a radius found at the extremity of the spoke that has a value of approximately 1.5 mm. In some cases, the radius is found on only one side of the spoke.

In some embodiments, the reduced cross-section of the edge geometry of the spoke includes a gradual taper portion.

In such a case, the taper portion may form an included angle with the main body geometry of approximately 11.8 degrees.

The spoke edge geometry may also include a transition radius found between the main body geometry and the taper portion that has a value of approximately 20 mm.

In further embodiments, the taper portion of the spoke edge geometry may have a width of approximately 15 mm.

In other embodiments, the reduced cross-section of the edge geometry may include a step portion.

In such a case, the thickness of the step portion is approximately 2 mm.

Sometimes, the width of the step portion ranges from 4-11 mm.

In other embodiments, spoke edge geometry includes transition radii that have a value of approximately 1.5 mm.

A tire according to another aspect of the present invention includes a tread and a spoke that has free spoke edge geometry along an axial extent of the spoke that has at least one side that lacks a blend, chamfer or other transition geometry near the free edge of the spoke.

In such a case, the spoke edge geometry may also have a portion having a reduced cross-section near the edge of the spoke.

In some cases, the spoke has a neutral bending plane and the flash found on the edge of the spoke is oriented substantially parallel to said neutral bending plane.

The present invention also includes a mold for forming a spoke for a tire comprising a first mold half, a second mold half, cavities and telescoping cores having an angled shut off surface that extend pass the cavities and into a mold half and contact or nearly contact said mold half on said angled shut off surface.

In some cases, the cavities have a radius at their end portion opposite the side of the cavity that is proximate to an angled shut off surface.

In other cases, the cavities may have a draft angle and the shut off surface may have the same angle.

In other embodiments, the cavities may have a reduced cross-section at their end portion.

In any case, it is ideal If the flash produced by a mold forming a spoke is substantially parallel to the neutral bending plane of the spoke. By substantially parallel, if is meant that the direction of the flash forms a forty-five degree angle or less with the neutral bending plane of the spoke in the area where the flash is found. In some cases, it ideal that the angle is virtually zero.

Additional embodiments of the present subject matter, not necessarily expressed in the summarized section, may include and Incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE PARTICULAR EMBODIMENTS

Reference will now be made in detail to embodiments of the invention, one or more examples of which are illustrated in the Figures. Each example is provided by way of explanation of the invention, and not meant as a limitation of the invention. For example, features illustrated or described as part of one embodiment can be used with another embodiment to yield still a third embodiment. It is intended that the present invention include these and other modifications and variations. It should be noted that for the purposes of discussion, only a portion of the exemplary tire embodiments may be depicted in one or more of the figures. Reference numbers are used in the Figures solely to aid the reader in identifying the various elements and are not intended to introduce any limiting distinctions among the embodiments. Common or similar numbering for one embodiment indicates a similar element in the other embodiments.

Figure 1:
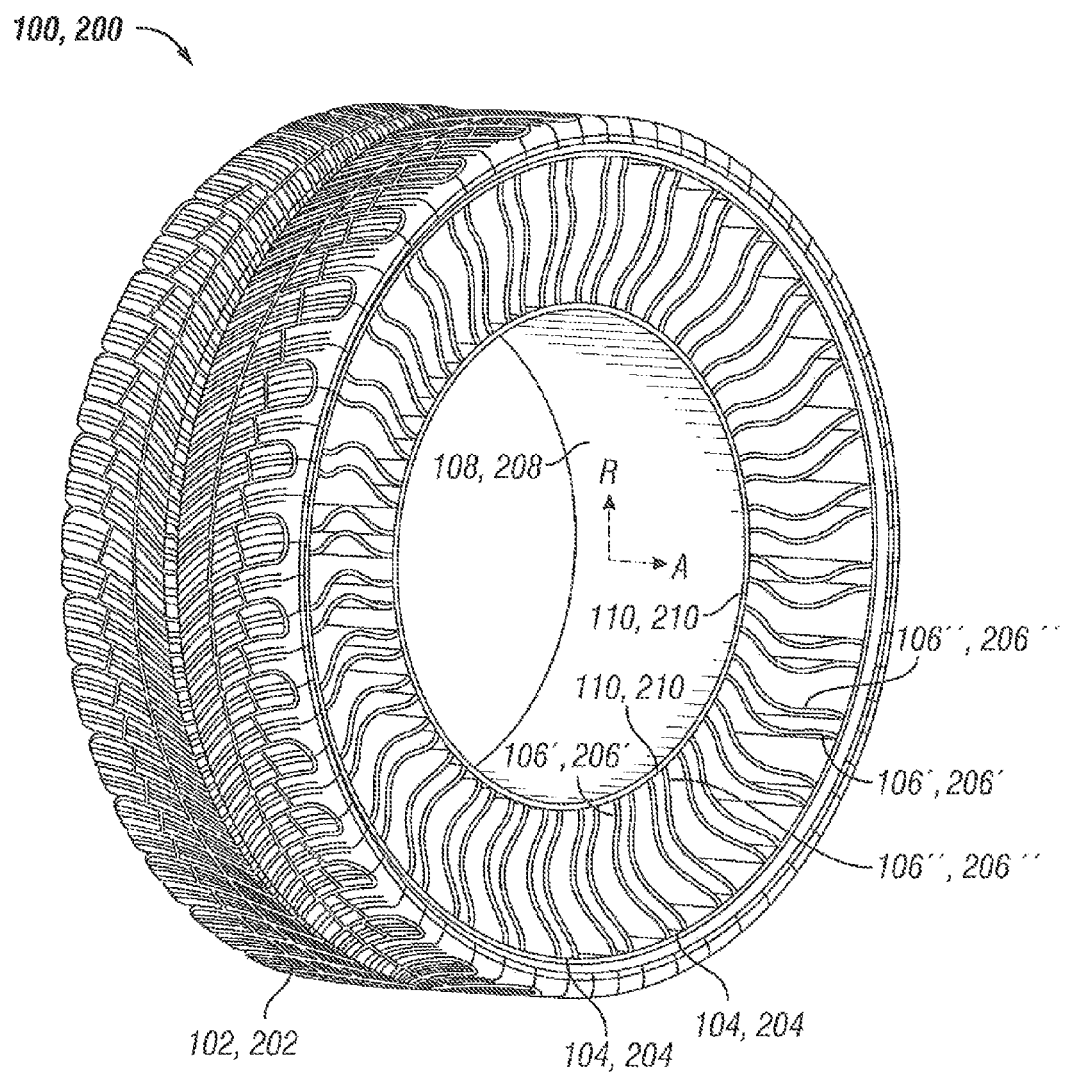
FIG. 1 is a perspective view of a non-pneumatic tire that has spokes.
Figure 2A:
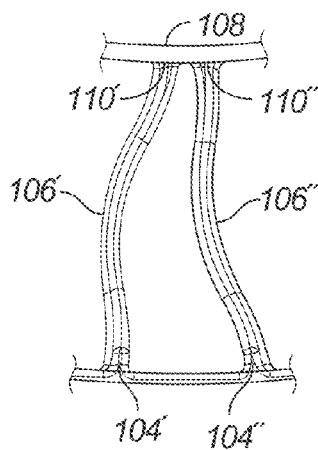
FIG. 2A is a front view of a pair of spokes of a first configuration that have been used previously in a non-pneumatic tire with the tread removed for clarity.
Figure 2B:
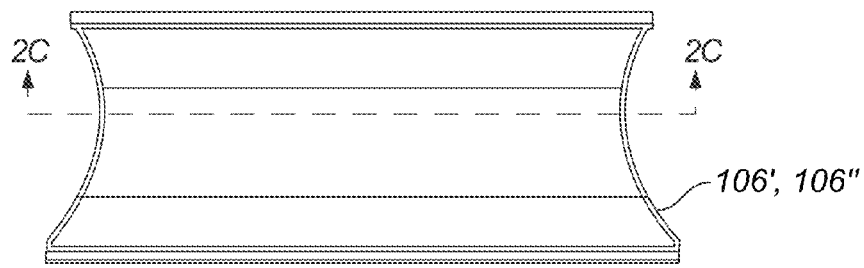
FIG. 2B is a side view of the spokes of FIG. 2A.
Figure 2C:
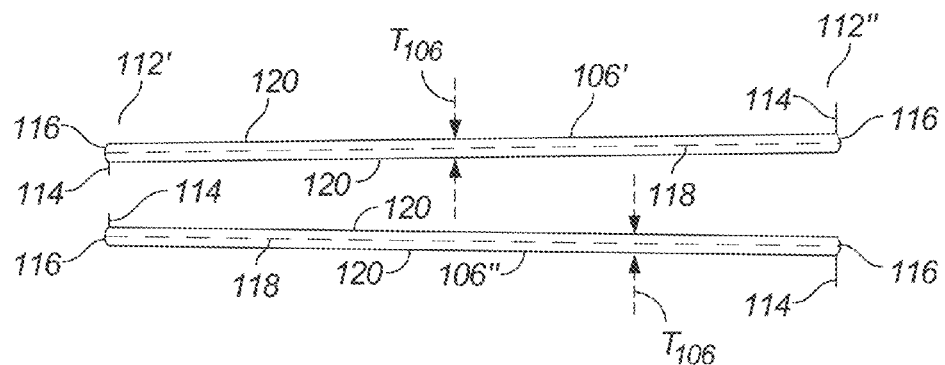
FIG. 2C is a sectional view of the spokes of FIG. 2B taken along line 2C-2C thereof.
Figure 3:
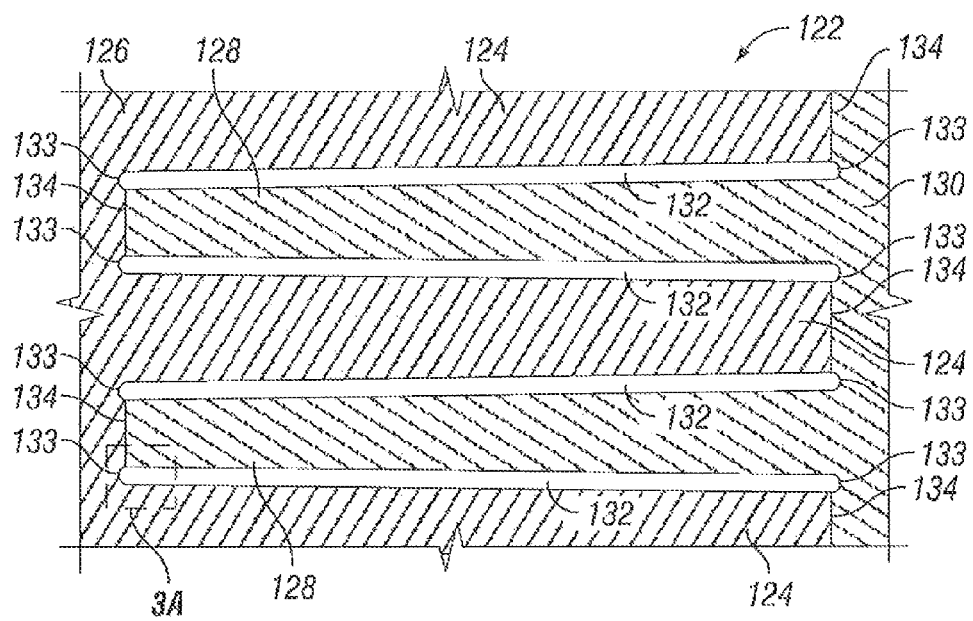
FIG. 3 is a partial sectional view of a previous mold construction used to form the spoke geometry shown in FIGS. 2A thru 2C that is susceptible to molding flaws.
Figure 4:
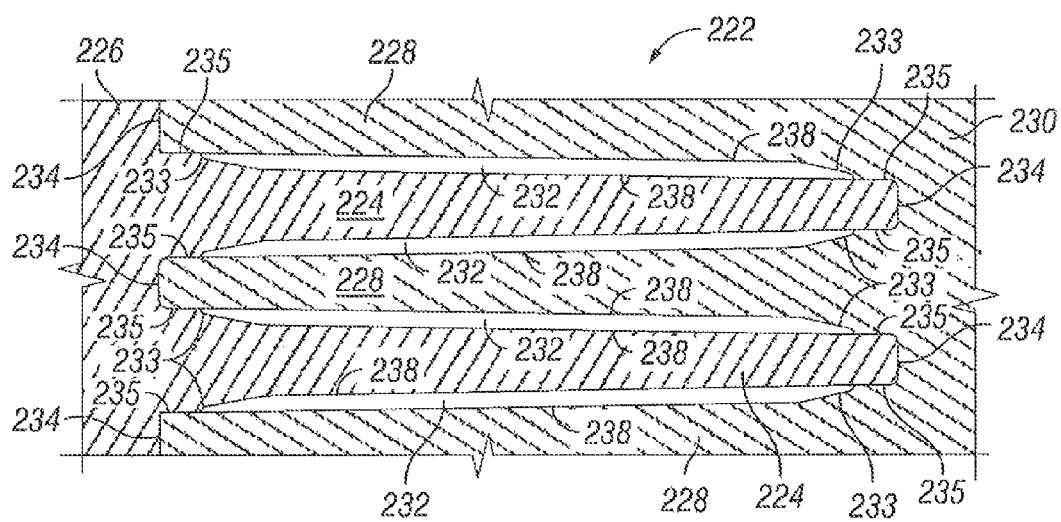
FIG. 4 is a partial sectional view of a new mold construction according to an embodiment of the present invention that forms new spoke geometry according to another embodiment of the present invention.

Given the tendency of the previous mold construction to produce molding flaws, the inventors of the present invention proceeded to alter the construction of the mold and the spoke geometry so that the spokes would not fail due to molding flaws. FIG. 4 shows one embodiment of the molding solution that has been devised.

The newly designed mold 222 is similar in many respects to the previous mold design and comprises a first set of telescoping cores 224 that extend from a first mold half 226 and that interarticulate with a second set of telescoping cores 228 that extend from a second mold half 230 that form the majority of the surface area of the cavities 232, which are the negative image of the spokes and that form the spokes. These cores 224, 228 are called telescoping because they extend pass the cavities 232 and into the opposite mold half 226, 230. Each core has a 0.25° of draft on a side and this in conjunction with the interarticulation of the cores 224, 228 allows the spokes to maintain a fairly constant thickness which helps maintain the strength of the spokes. Again, it should be noted that these cores 224, 228 are actually arranged in a circular array in the mold 222 and that this figure shows their cross-sections projected onto a flat plane for ease of illustration. Also, common mold features such as venting for helping proper mold fill by allowing the escape of trapped gas and alignment features such as taper pins for facilitating mold alignment for the cores 224, 228 and mold halves 226, 230 have been omitted for the sake of clarity. Also, the cores are shown to be solid extensions of the mold halves 226, 230 but in actuality these are often separate inserts that are retained within the mold halves 226, 230 and that can be easily replaced should a core 224, 228 be damaged.

Looking more closely at the ends 233 of the cavities 232 and the ends of the telescoping cores 224, 228, it can be seen that the new design incorporates angled shut off surfaces 235 found just past the ends 233 of the cavities 232 that terminate in flat shut off surfaces 234 that contact or nearly contact the opposing mold half 226, 230. For this particular embodiment, the angled shut off surfaces 235 are parallel with the rest of the draft of the core 224, 228 but could be altered if desired as will be discussed more below. Also, the flat shut off surfaces 234 are shown to be line to line or coincident between the cores 224, 228 and mold halves 226, 230, but this does not necessarily need to be the case.

A small gap may be provided in these areas to make sure the overall length of the core 224, 228 does not limit the core's protrusion into the opposing mold half 226, 230, helping to ensure that the angled shut surfaces 235 make contact between each core 224, 228 and mold half 226, 230. This helps to prevent a liquid such as polyurethane from seeping into a crack if a large enough gap is created due to machining tolerances, core deflection due to mold processing conditions, etc. As discussed previously, such a gap creates the undesired flash that has been previously described near the edges of the spokes. Also, since the parting line in these areas is essentially parallel to the direction of the extension of the cores 224, 228, any flash will be nearly parallel to the bulk of the bending plane of the spokes, which is more desirable than the orientation created by the previous mold design as will be more fully explained later.

This particular embodiment is very successful in eliminating mold mismatch as the cores 224, 228 extend past the ends of the cavities 232, making such mismatch practically impossible. This is true because the straight surface 238 of the cores 224, 228 is forced to be tangent to the end 233 of the cavities 232 because it is part of the same surface that forms the angled shut off surface 235.

Figure 5A:
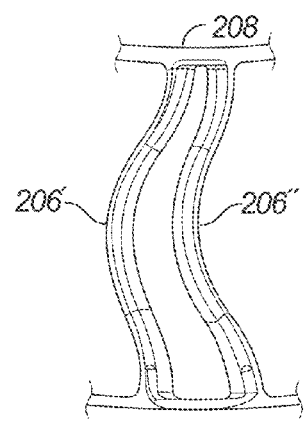
FIG. 5A is a front view of a pair of spokes of a second configuration according to an embodiment of the present invention with the tread removed for clarity.
Figure 5B:
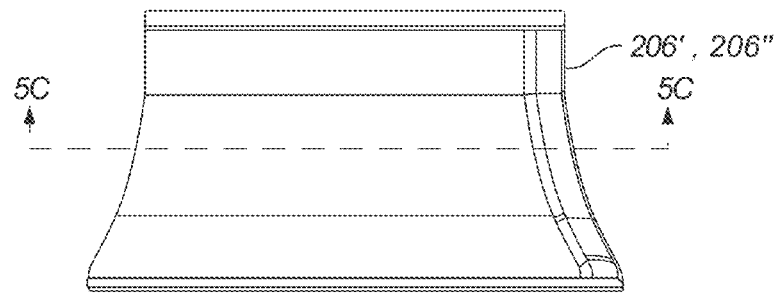
FIG. 5B is a side view of spokes of FIG. 5A.
Figure 5C:
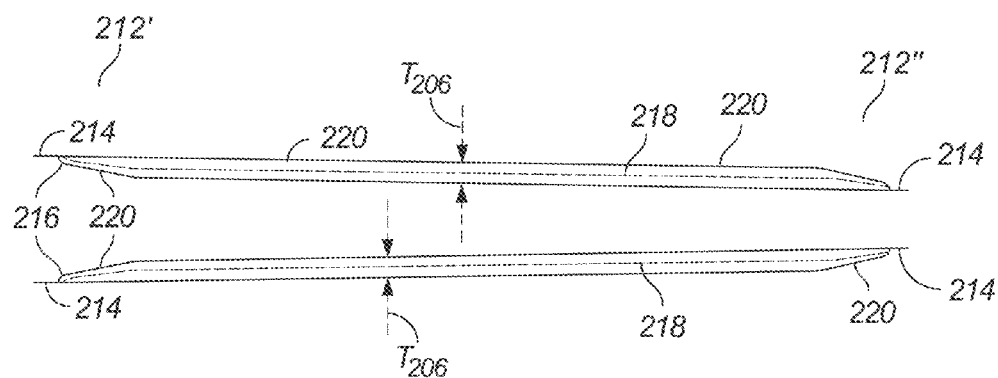
FIG. 5C is a sectional view of the spokes of FIG. 5B taken along line 5C-5C thereof.

Turning now to FIGS. 5A, 5B and 5C, front, side and sectional views respectively of the spokes created by cavities of the mold just described can be seen. For the sake of clarity, the tread has been omitted. Focusing on FIG. 5C, the cross-sectional shape of spokes 206', 206" can be seen. The thickness of the main portion of the spoke, $T_{206}$, which is relatively consistent at 4 mm, and the edges 212', 212" of the spokes 206', 206" where flash 214 frequently occurs during the molding process are illustrated. The flash 214 is located near the edges 212', 212" Of the spokes 206', 206" where partial radii 216 have been added to aid in stress reduction as the spokes 206', 206" cycle between tension and compression as the tire 200 rotates on a road surface under a vertical load. Since the cross section of the spokes 206', 206" has a predetermined tapered shape near the edges of the spokes, the distance from neutral axis or plane 218 about which each spoke 206', 206" flexes to an exterior surface 220 of the spoke 206', 206" is reduced, decreasing the stresses and strains locally and the likelihood of spoke failure. Also, the location of any flash 214 is found virtually on the neutral plane 218, reducing the bending moment and stress where the flash is found, further decreasing the possibility of fatigue failure at this spot. The exact geometry of the tapered edge sections will be described later.

Figure 6:
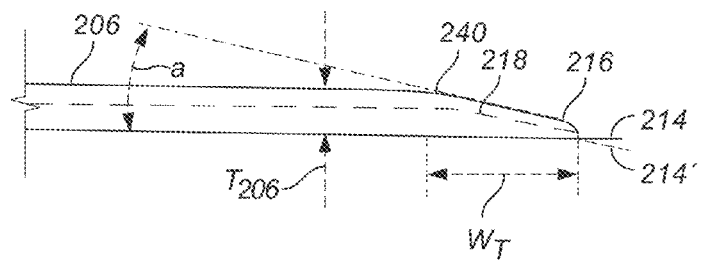
FIG. 6 is an enlarged view of the edge of the spokes shown in FIG. 5C showing the dimensions of the geometry of the spoke.
Figure 3A:
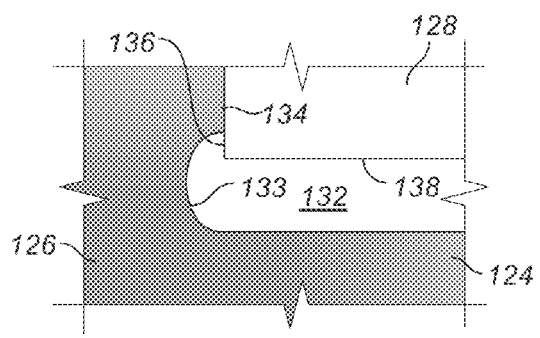
FIG. 3A is an enlarged view of the end of a cavity of the mold of FIG. 3 that forms a spoke to more clearly show mold mismatch.

Now, the orientation of any flash 214 is essentially parallel to the majority of the bending axis or plane 218 of the spoke 206, making the initiation of cracks less likely as compared to the previous spoke and mold design because the thinnest portion of the flash is bent meaning that the bending moment and associated bending stress experienced by the flash is minimized. Put info other words, the flash is now oriented in Its most pliable configuration relative to the bending of the spokes making it less prone to cracking. However, potential flash 214 may be slightly oblique to the bending plane 218 locally near the edge 212 of the spoke due to the taper which may alter the path of the bending plane as shown in FIGS. 5C and 6. Therefore, it is contemplated that small adjustments to the shut off surface may be made so that the orientation of the flash is more parallel to the bending plane 218 locally near the edge of the spoke 206. This may result in an alternate flash orientation 214' as shown in FIG. 6. Of course, this may involve a tradeoff between optimizing the orientation of the flash and preventing mold mismatch as changing the shut off angle means that a transition of geometry will be located on a mold core and if this transition does not perfectly coincide with the position of the end of the cavity, a small ledge or corner could be created as was the case with the previous mold design (see FIG. 3A). Another benefit of changing the mold shut off angle is that using a larger angle may decrease the amount of wear on the mold core or the opposing mold half upon which the mold core shuts off, reducing the amount of mold maintenance that is necessary.

Focusing solely on FIG. 6, the specific spoke edge geometry of this embodiment of the present invention is described. The main portion of the spoke 206 has a thickness, $T_{206}$, which is approximately 4 mm. The taper section forms an included angle, α, with the extremity of the spoke of approximately 11.8°, There is a transition radius 240 where the taper meets the main body of the spoke that has a value of approximately 20 mm. The width, $W_T$, of the tapered section is approximately 15 mm and the value of the partial radius 216 at the edge of the spoke is approximately 1.5 mm. These values are only one example and the dimensions could be adjusted depending on the tire, mold or spoke application. The reason there is only a partial radius here versus the full radius used in the previous mold design is that adding a full radius is not possible when using an angled shut off formed by a telescoping core as this would require the presence of a feather edge in the mold, which over time would break down and cause molding problems as well as possible flaws on the spokes.

Figure 7:
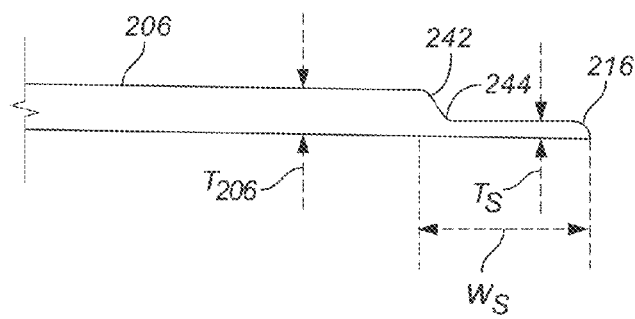
FIG. 7 is an enlarged view of the edge of the spokes according to an alternate embodiment of the present invention.

FIG. 7 shows an alternate spoke profile that uses a step reduction in the cross-section of the spoke rather than a tapered section. For this version of the spoke 206, the main spoke thickness, $T_{206}$, which is approximately 4 mm, is reduced to a step thickness, $T_S$, of approximately 2 mm. The width of the step section, $W_S$, can range from 4 to 11 mm. Finally, there is a series of transition radii 242, 244 between the step section and main sections of the spoke as well as the partial radius 216 found at the edge of the spoke. The value of ail these radii may be approximately 1.5 mm. These values are only one example and the dimensions could be adjusted depending on the tire, mold or spoke application. This embodiment provides the same advantages as the one shown in FIG. 6.

Figure 8:
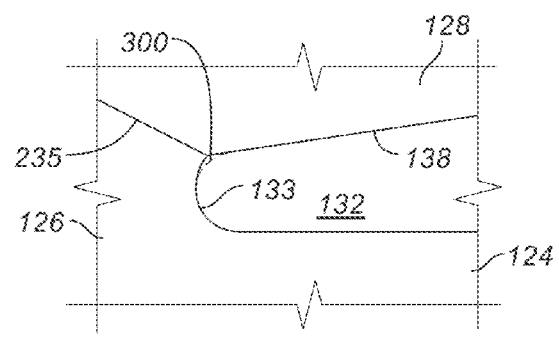
FIG. 8 is an enlarged view of the end of a cavity that uses an angled shut off and no spoke edge reduction for reorienting flash for preventing spoke failure.

It should be noted that the present invention also includes other spoke geometries not disclosed or fully described herein. For example as shown by FIG. 8, it is possible that the spoke thickness does not need to be reduced near the edge of the spoke and a spoke similar to the original spoke design could be molded using telescoping cores 128 minus the portion 300 of the edge radius of the spoke that is proximate the angled shut off surfaces 236 to prevent the creation of a feather edge in the mold. As can be imagined, adding the imaginary area 300 to the mold half 128 would create a feather edge that would break down quickly. In other words, changing the position and/or orientation of the flash as well as alleviating mold mismatch may ha enough to prevent spoke failure and are considered sufficient to practice the present invention. On the other hand, reducing the cross-section of the edge of the spokes by itself may be enough to prevent spoke failure and is considered sufficient to practice the present invention as well. In many situations, both techniques can be employed simultaneously.

In conclusion, it should be understood that the present invention includes various other modifications that can be made to the exemplary embodiments described herein that come within the scope of the present invention as defined by the appended claims. For example, the specific examples given have involved the use of polyurethane but it is contemplated that other thermosetting or thermoplastic materials could be used. In addition, the mold discussed herein was a rotational mold but other molding or casting technologies could be used such as injection molding. Similarly, the present invention can be applied to any tire that has spokes whether it uses an internal gas or not. These and other embodiments are within the spirit and scope of the present invention.

What is claimed is:

1. A tire that comprises a tread and a spoke having main body geometry and an axially adjacent free edge geometry found at an axial extremity of the spoke that has a reduced cross-sectional area as compared to the main body geometry, wherein the cross section of the main body geometry is defined by a plane that is parallel to a radially oriented plane that defines the cross section of the free edge geometry.

2. The tire according to claim 1 wherein the thickness of the main body geometry of the spoke is approximately 4 mm.

3. The tire according to claim 2 wherein the spoke edge geometry also includes a radius found at the extremity of the spoke that has a value of approximately 1.5 mm.

4. The tire according to claim 3 wherein said radius is found on only one side of the spoke.

5. The tire according to claim 1 wherein the reduced cross-section of the edge geometry of the spoke includes a gradual taper portion.

6. The tire according to claim 5 wherein the taper portion forms an included angle with the main body geometry of approximately 11.8 degrees.

7. The tire according to claim 6 that further includes a transition radius found between the main body geometry and the taper portion that has a value of approximately 20 mm.

8. The tire according to claim 5 wherein the width of the gradual taper portion of the spoke edge geometry is approximately 15 mm.

9. The tire according to claim 1 wherein the reduced cross-section of the edge geometry includes a step portion.

10. The tire according to claim 9 wherein the thickness of the step portion is approximately 2 mm.

11. The tire according to claim 10 wherein the width of the step portion ranges from 4-11 mm.

12. The tire according to claim 11 wherein the spoke edge geometry further comprises transition radii that have a value of approximately 1.5 mm.

13. A tire that comprises a tread and a spoke that has free spoke edge geometry along an axial extent of the spoke that has at least one side that lacks a blend, chamfer or other transition geometry near the free edge of the spoke, wherein the spoke has a neutral bending plane oriented in the axial direction and also has flash found on the edge of the spoke that is oriented substantially parallel to said neutral bending plane.

14. The tire according to claim 13 wherein the spoke edge geometry further includes a portion having a reduced cross-section near the edge of the spoke compared to the axially adjacent main body geometry.

15. A mold for forming a spoke for a tire said mold comprising a first mold half, a second mold half, cavities and telescoping cores having an angled shut off surface that extend pass the cavities and into a mold half and contact or nearly contact said mold half on said angled shut off surface, said mold forming a negative space defining said spoke, said spoke having main body geometry and an axially adjacent free edge geometry, said free edge geometry having a reduced cross-section area as compared to the main body geometry, wherein the cross section of the main body geometry defined by a plane that is parallel to a radially oriented plane that defines the cross section of the free edge geometry.

16. The mold according to claim 15 wherein the cavities have a radius at their end portion opposite the side of the cavity that is proximate to an angled shut off surface.

17. The mold according to claim 15 wherein the cavities have a draft angle and the shut off surface has the same angle.

* * * * *